United States Patent Office 3,056,452
Patented Oct. 2, 1962

3,056,452
SURFACTANT-WATER FLOODING PROCESS
George G. Bernard and Orrin C. Holbrook, Crystal Lake, Ill., assignors to The Pure Oil Company, Chicago, Ill., a corporation of Ohio
No Drawing. Filed Nov. 16, 1959, Ser. No. 853,002
9 Claims. (Cl. 166—4)

This invention relates to methods of secondary recovery of petroleum from depleted reservoirs, and more particularly to methods of recovery by surfactant floodwater injection.

Iti s well known in the art that an oil-containing reservoir when depleted to a point where it is no longer profitable to produce oil by a pumping operation, may still contain as much as fifty percent or more of the oil originally in place. Many methods have been proposed in the past for the recovery of a part of this residual oil, such as water-flooding or gas-repressuring, which have had some degree of success, but these methods leave a large proportion of the oil in the reservoir.

More recently, it has been proposed to inject floodwater to which has been added surface-active agents to reduce the interfacial tension between the reservoir oil and the injected water, and thus obtain the displacement of larger quantities of the residual oil. Non-ionic surfaceactive compounds have been found to be well suited for oil recovery since they are chemically inert and better stay in solution in the flood-water. Even non-ionic surfactants are, however, strongly adsorbed by the formation sand, and in order to maintain a sufficient concentration of surfactant at the oil-water interface, either the water pumped into the formation must contain an undesirably large concentration of surfactant, or many pore volumes of water must be pumped through the formation before surfactant can be detected in the produced brine, indicating that surfactant has been brought into contact with as much of the formation as possible.

Moreover, the adsorption of surfactant on the reservoir rock reduces the concentration of surfactant at the leading edge of the floodfront, with the result that the surfactant front advances through the reservoir more slowly than the floodfront. Therefore little or no surfactant is present at the interface between the reservoir oil and the injected floodwater, and it is at this interface that the presence of surfactant is most desired. The lagging of the surfactant front behind the flood-front is discussed in detail by Taber, "The Injection of Detergent Slugs in Water Floods," Petroleum Transactions, AIME, 1958, pp. 186-192. Taber and other experimenters have found that the surfactants generally proposed for use as floodwater additives are adsorbed to such a great extent that when added to floodwater in economical concentrations many pore volumes of the surfactant-containing floodwater must be passed through a core before the presence of even small amounts of surfactant is detected in the core effluent.

In order to mitigate the loss of surfactant by adsorption on the rock surfaces, it has been proposed by Newcombe et al., U.S. Patent, 2,748,080, to add borax to the surfactant floodwater solution. While this method has been useful to a limited extent, the borax required adds to the cost of the method and the loss of surfactant still occurs to an appreciable degree. Thus, Newcombe has found that the surfactant, when added in reasonable concentrations together with borax, may appear in the effluent after 2 or 3 pore volumes of water have passed through the core. It is evident that while the method of Newcombe mitigates the loss of surfactant in the reservoir it is not effective for maintaining the surfactnat in solution at the leading edge of the floodfront.

It is a primary object of this invention to provide a superior water-flooding process based upon the use of surfactant materials which are not adsorbed by the reservoir rock or otherwise removed from solution to an appreciable extent. It is another object of this invention to provide a method of tracing the progress of a waterflood front in a secondary recovery operation by adding to the floodwater a surfactant material which is not appreciably adsorbed by the formation, and detecting the initial presence of this surfactant in fluids produced from the output wells.

Now, in accordance with this invention it has been discovered that certain ditertiary acetylenic glycols, a class of materials only recently recognized as surface active, are not adsorbed to any significant extent by sandstone and other solid formation constituents. The surfactants useful in accordance with this invention are compounds of the formula

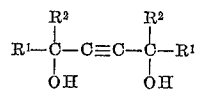

wherein $R^1$ and $R^2$ are lower aliphatic radicals having 1 to 2 and 2 to 4 carbon atoms respectively, but wherein $R^1$ and $R^2$ together have no more than 5 carbon atoms. Surfactant materials comprising mixtures of compounds of the aforedescribed formula are available commercially under the trade names of Surfynols 102, 104, and 82. Examples of pure compounds which may be used in accordance with the methods of this invention include diethyl dimethyl butynediol, tetraethyl butynediol, diethyl dipropyl butynediol, and dimethyl dibutyl butynediol. It is preferred, however, to use commercially available surfactant materials which are mixtures of the compounds of the afore-described class, such as Surfynol 104 which may be identified as a white, waxy material having a melting point of 37 to 38° C. and a boiling point of about 260° C.

It has been most unexpectedly found that these surfactant compounds, utilized according to the method of this invention, are not adsorbed to any appreciable extent in the reservoir rock. When used in conjunction with water-flooding operations, dissolved in flood water at concentrations of about 0.01-5.00%, or injected in aqueous solution as a bank ahead of the flood water, these surfactants enhance oil recovery as do certain other surfactants known to the prior art, such as "Triton X-100," but the ditertiary acetylenic glycols utilized in this invention are not adsorbed by the formation surfaces to any significant extent, while Triton X-100 and other previously proposed surfactants are adsorbed to so great an extent as to render their use impractical in waterflood operations. This startling difference in a adsorbtion characteristics has been demonstrated by experiments in which 0.03% by weight of Triton X-100 and 0.03% by weight of Surfynol 104 were dissolved in a 1% aqueous sodium chloride solution, which solution was passed through identical sandstone cores, and the concentration of the surfactant in the effluent water was determined by surface tension measurements. The results of these experiments are shown in Table I.

*Table 1*

| Effluent From Core,[4] Pore Volumes | Triton X-100 [1] | | Surfynol 104 [2] | |
|---|---|---|---|---|
| | Surface Tension of Effluent, dynes/cm. | Percent [3] Reduction of Surface Tension | Surface Tension of Effluent, dynes/cm. | Percent [3] Reduction of Surface Tension |
| 0.50 | 73 | 0 | 73 | 0 |
| 0.75 | 73 | 0 | 73 | 0 |
| 1.0 | 73 | 0 | 59.5 | 45 |
| 1.25 | 73 | 0 | 47.5 | 85 |
| 1.58 | 73 | 0 | 44.2 | 96 |
| 1.75 | 73 | 0 | 43.5 | 98.3 |
| 2 | 73 | 0 | 43.0 | 100 |
| 3 | 73 | 0 | 43.0 | 100 |
| 6 | 73 | 0 | | |
| 11 | 73 | 0 | | |
| 21 | 73 | 0 | | |
| 31 | 71 | 5.05 | | |
| 41 | 63 | 25.3 | | |
| 51 | 46 | 68.3 | | |

[1] Surface tension of 0.03% Triton X-100=33.4 dynes/cm. Triton X-100 is a commercial surfactant known in the art as a superior floodwater additive and is therefore frequently used in this art for purposes of comparative tests. For additional data, see the Taber et al. reference cited supra.
[2] Surface tension of 0.03% Surfynol 104=43.0 dynes/cm.
[3] $\frac{73-(\text{observed surface tension of effluent})}{73-(\text{surface tension 0.03\% surfactant solution})} \times 100 =$ percent reduction of surface tension.
[4] Core initially saturated with 1% NaCl solution having a surface tension of 73. This brine (approx. 1 pore volume) must be displaced from the core before any surfactant appears in the effluent.

It is apparent that Triton X-100 was still being adsorbed by the core after 54 volumes of solution had passed theretherethrough, while the Surfynol 104 passed through the core substantially without being adsorbed from the outset, and showed no evidence whatever of being adsorbed after only about 2 pore volumes had passed through the core. Of equal importance is the fact that substantial and effective amounts of surfactant were found to be present in the core effluent after only 1 pore volume of Surfynol 104-containing water had been injected. Thus, as soon as the connate water initially in the core was displaced, surfactant appeared in the effluent, indicating that the surfactant was present at the leading edge of the floodfront. From an inspection of Table I it can be seen that the Surfynol 104 is most effectively used in an amount equivalent to the weight of about 0.0003 to 0.0009 pore volume of water, or more specifically, 0.0006 pore volume of water. The results of experiments shown in Table I demonstrate that there was a significant percentage reduction of the surface tension of the effluent after one pore volume of solution had passed through the core, the solution consisting of 0.03% by weight of Surfynol 104 dissolved in a 1% aqueous sodium chloride solution. Since the specific gravity of the injected aqueous solution is approximately one, the amount of Surfynol 104 contained in one pore volume of solution at a concentration of 0.03% by weight is equivalent to the weight of about 0.0003 pore volume of water. The limits of 0.0006 and 0.0009, which are derived in a like manner, correspond to the amount of Surfynol in 2 and 3 pore volumes of floodwater. On the other hand, the test conducted with Triton X-100 indicates that no surfactant was present at the floodfront; indeed, no surfactant appeared in the effluent until over 21 pore volumes of flood-water had been injected. It is evident that this unique property of the ditertiary acetylenic glycols surfactants makes them extremely useful in surfactant water-flood secondary recovery operations, both for recovering additional quantities of fluid from the reservoir, and for use as a tracer to detect the initial presence of injected floodwater in the output wells.

It is frequently desirable to evaluate the progress of a floodwater front by determining the initial presence of floodwater in the fluids produced from the various output wells in the oil field. Suitable tracer material should not be adsorbed by the formation, and should be simple to identify or detect in low concentrations. The ditertiary acetylenic glycols used in the method of this invention possess both these properties. The data in Table I show that the materials are not adsorbed to any significant degree, and because they are surface active, their presence can be detected by determining the surface tension of the aqueous portion of the produced well fluids. Conventional surface tension-measurement devices may be used to detect the presence of surfactant.

As a specific example of the method of this invention, a petroleum-containing subterranean reservoir is produced by a secondary-recovery, water-flood process in which water containing 0.03% by weight of tetraethyl butynediol is injected through an input well and into the formation. The formation is penetrated by four producing wells placed at the corners of a 100 ft. square. The injection well is located at the center of this square to form a 5-spot pattern. Petroleum oil and connate water are produced from the 4 output wells as the surfactant-containing water is injected to the input well. After the injection of 800,000 cubic feet of water, surface tension measurements made on the aqueous portion of the output-well effluents indicate a drop in the surface tension of the water produced from producing well No. 1. At this time it is established that the floodfront has reached well No. 1. After the injection of another 100,000 cubic feet of water, the presence of surfactant in the fluid from well No. 3 is noted. After the injection of 50,000 additional cubic feet of water, surfactant is found to be present in the fluids produced from wells 2 and 4. The data thus obtained make it apparent that a substantially uniform, circular floodfront exists in the formation, but with a slightly more rapid advance occurring in the direction of well No. 1.

As another example of the method of this invention, a core containing connate water and petroleum oil is treated by injecting thereinto an aqueous solution comprising 5% by weight of sodium chloride, 1% by weight of calcium chloride, and 0.04% by weight of dimethyl dibutyl butynediol, and the quantities of water and oil in the effluent from the core are separately measured. The surface tension of the aqueous portion of the core effluent is periodically measured and determined initially to be 73 dynes per centimeter. After the injection of 0.75 pore volume of surfactant-containing water into the core, it is determined that 0.40 pore volume of oil has been produced, and 0.35 pore volume of water has been produced. At this time it is further found that the surface tension of the effluent water is 62 dynes per centimeter. The fact that effluent containing surfactant is found before the injection of one pore volume of water is not surprising in view of the fact that slightly more than 0.25 pore volume of oil initially present in the core has remained as residual oil, thus decreasing the effective pore volume of the core.

As another specific example of the method of this invention, a core containing 0.75 pore volume of crude oil and 0.25 pore volume of water is treated by injection with floodwater containing 0.02% by weight of diethyl dipropyl butynediol. After the injection of 0.80 pore volume of floodwater, it is determined that the surface tension of the aqueous portion of the core effluent has decreased from an initial value of 73 dynes per centimeter to a value of 64 dynes per centimeter.

The embodiments of this invention in which an exclusive property or privilege is claimed are defined as follows:
1. In a method for recovering oil from subterranean reservoirs by injecting water through an input well and producing fluids from said reservoir through an output well, the improvement comprising simultaneously tracing the water-flood-front and improving the production of oil by incorporating in said water at least one surfactant compound of the formula $$R^1-\underset{OH}{\underset{|}{C}}-\overset{R^2}{\overset{|}{C}}\equiv C-\underset{OH}{\underset{|}{C}}-\overset{R^2}{\overset{|}{C}}R^1$$

wherein $R^1$ and $R^2$ are lower aliphatic radicals having 1 to 2 and 2 to 4 carbon atoms respectively, but wherein $R^1$ and $R^2$ together have no more than 5 carbon atoms.

2. A method according to claim 1 in which the amount of said surfactant compound incorporated in said water is equivalent to the weight of about 0.0003 to 0.0009 pore volume of water in a concentration of about 0.01 to 5.00% by weight.

3. A method according to claim 2 in which the amount of said surfactant compound incorporated in said water is equivalent to the weight of about 0.0006 pore volume of water in a concentration of about 0.03% by weight.

4. In a method for recovering oil from subterranean reservoirs by injecting water through an input well and producing fluids from said reservoir through an output well, the improvement comprising tracing the waterflood-front by incorporating in said water at least one surfactant compound of the formula $$R^1-\underset{OH}{\underset{|}{C}}-\overset{R^2}{\overset{|}{C}}\equiv C-\underset{OH}{\underset{|}{C}}-\overset{R^2}{\overset{|}{C}}R^1$$

wherein $R^1$ and $R^2$ are lower aliphatic radicals having 1 to 2 and 2 to 4 carbon atoms respectively, but wherein $R^1$ and $R^2$ together have no more than 5 carbon atoms.

5. A method according to claim 4 in which the amount of said surfactant compound incorporated in said water is equivalent to the weight of about 0.0003 to 0.0009 pore volume of water in a concentration of about 0.01 to 5.00% by weight.

6. A method according to claim 5 in which the amount of said surfactant compound incorporated in said water is equivalent to the weight of about 0.0006 pore volume of water in a concentration of about 0.03% by weight.

7. A method according to claim 4 in which the initial presence of said surfactant compound in the fluids produced from the output well is detected by measuring the surface tension of the aqueous portion of said fluids.

8. In a method for recovering oil from subterranean reservoirs by injecting water through an input well and producing fluids from said reservoir through an output well, the improvement which comprises improving the production of oil by incorporating in said floodwater at least one surfactant compound of the formula $$R^1-\underset{OH}{\underset{|}{C}}-\overset{R^2}{\overset{|}{C}}\equiv C-\underset{OH}{\underset{|}{C}}-\overset{R^2}{\overset{|}{C}}R^1$$

wherein $R^1$ and $R^2$ are lower aliphatic radicals having 1 to 2 and 2 to 4 carbon atoms respectively, but wherein $R^1$ and $R^2$ together have no more than 5 carbon atoms, the amount of said surfactant compound incorporated in said water being equivalent to the weight of about 0.0003 to 0.0009 pore volume of water in a concentration of about 0.01 to 5.00% by weight.

9. A method according to claim 8 in which the amount of said surfactant compound incorporated in said water is equivalent to the weight of about 0.0006 pore volume of water in a concentration of about 0.03% by weight.

References Cited in the file of this patent

UNITED STATES PATENTS

| | | |
|---|---|---|
| 2,800,962 | Garst | July 30, 1957 |
| 2,846,294 | Patterson et al. | Aug. 5, 1958 |